United States Patent

Kodama et al.

Patent Number: 5,997,620
Date of Patent: Dec. 7, 1999

[54] POLISHING COMPOSITION

[75] Inventors: Hitoshi Kodama; Hideki Otake; Keigo Ohashi, all of Aichi, Japan

[73] Assignee: Fujimi Incorporated, Nishikasugai-gun, Japan

[21] Appl. No.: 09/200,892

[22] Filed: Nov. 27, 1998

[51] Int. Cl.[6] .......................... B24B 1/00; H01L 21/8229; H01L 21/8239
[52] U.S. Cl. .................................. 106/3; 51/307; 51/308; 51/309; 216/89; 438/692; 438/693
[58] Field of Search ..................................... 438/692, 693; 216/89; 51/308, 309, 307; 106/3

[56] References Cited

U.S. PATENT DOCUMENTS 4,959,113  9/1990  Roberts ..................................... 156/636

FOREIGN PATENT DOCUMENTS

WO 96/16436  5/1996  WIPO .

Primary Examiner—C. Melissa Koslow
Attorney, Agent, or Firm—Oblon, Spivak, McClelland, Maier & Neustadt, P.C.

[57] ABSTRACT

A polishing composition for polishing a memory hard disk comprising water and at least one abrasive selected from the group consisting of silicon dioxide, aluminum oxide, cerium oxide, zirconium oxide, titanium oxide, silicon nitride and manganese dioxide, which further contains an iron compound dissolved in the composition, said iron compound being selected from the group consisting of iron(III) nitrate, iron(III) sulfate, ammonium iron(III) sulfate, iron(III) perchlorate and an ion salt of an organic acid.

8 Claims, No Drawings

POLISHING COMPOSITION

BACKGROUND OF THE INVENTION

1. Field of the Invention

The present invention relates to a polishing composition useful for finishing polishing of the surface of a magnetic disk substrate in the preparation of a substrate for a magnetic disk to be used for a memory hard disk, i.e. a memory device useful for e.g. a computer. More particularly, the present invention relates to a polishing composition to be used for the preparation of a memory hard disk represented by e.g. a Ni—P disk, a Ni—Fe disk, an aluminum disk, a boron carbide disk or a carbon disk, particularly a polishing composition which provides a high stock removal rate in a polishing process for finishing a highly specular surface with a good surface roughness and which, at the same time, is applicable to a production technique for obtaining an excellent finished surface which is useful for a magnetic disk device having a large capacity and a high recording density. Further, the present invention relates to a method for polishing a memory hard disk employing such a polishing composition.

2. Discussion of Background

There have been continuing efforts for miniaturization and larger capacity for memory hard disks to be used for magnetic disk devices which are one of memory media for e.g. computers, and magnetic media are being changed from conventional coating type media to thin film media prepared by sputtering, plating or other methods.

A disk substrate (hereinafter referred to simply as "a substrate") which is most widely used at present, is one having an electroless Ni—P plating film formed on a blank material. Here, the blank material is one obtained by fairing an aluminum or other base plate by lathe processing by diamond turn, lapping by means of a PVA grindstone prepared by fixing SiC grinding material or other methods for the purpose of parallelization or planarization. However, by such various fairing methods, a relatively large waving can not completely be removed. And, the electroless Ni—P plating film will be formed along the waving on the blank material. Accordingly, such a waving will remain also on the substrate, and nodules or large pits will sometimes be formed. Here, the "nodules" are bulges having a diameter of at least about 50 $\mu$m, which are formed by bulging of a plating surface at such portions that impurities have been taken into the Ni—P plating film. The "pits" are dents formed by polishing on the surface of the substrate, and "fine pits" are dents having a diameter of less than about 10 $\mu$m, among them.

On the other hand, along with the increase in the capacity of memory hard disks, the surface recording density is increasing at a rate of a few tens % per year. Accordingly, the space on a memory hard disk occupied by a predetermined amount of recorded information, is narrower than ever, and the magnetic force required for recording tends to be weak. Accordingly, for recent magnetic disk devices, it is required to minimize the flying height of the head, which is a space between the magnetic head and the memory hard disk, and at present, the flying height of the head is reduced to a level of not higher than 0.15 $\mu$m.

Further, so-called texturing may sometimes be carried out to impart concentric circular scorelines to the substrate after polishing for the purposes of preventing sticking of the magnetic head for reading or writing information, to the memory hard disk and preventing non-uniformity of the magnetic field on the memory hard disk due to scorelines in a certain direction different from the rotational direction of the memory hard disk, formed on the substrate surface by polishing. Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced.

When a memory hard disk surface has a waving, the head moves up and down following the waving of the memory hard disk which is rotated at a very high speed. However, if the waving exceeds a certain height, the head will no longer be able to follow the waving, and the head will collide against the substrate surface, thus resulting in so-called "head crush", whereby the magnetic head or the magnetic medium on the memory hard disk surface may be damaged, which may cause a trouble of the magnetic disk device, or which may cause an error in reading or writing information.

On the other hand, head crush may occur also when a micro protrusion of a few $\mu$m is present on the memory hard disk surface. Further, when a pit is present on a memory hard disk, it is likely that information can not completely be written in, thus leading to a defect of information so-called a "bit defect" or failure in reading the information, which causes an error.

Accordingly, it is important to minimize the surface roughness of the substrate in the polishing step i.e. the step prior to forming a magnetic medium, and at the same time, it is necessary to completely remove a relatively large waving as well as micro protrusions, fine pits and other surface defects.

For the above purpose, it used to be common to carry out finishing by one polishing step by means of a polishing composition (hereinafter sometimes referred to as a "slurry" from its nature) comprising aluminum oxide or other various abrasives and water as well as various polishing accelerators. However, by the one polishing step, it has been difficult to satisfy all of the requirements for removing a relatively large waving as well as surface defects such as nodules and large pits on the substrate surface and for minimizing the surface roughness within a certain period of time. Accordingly, a polishing process comprising two or more steps, has been studied.

In a case where the polishing process comprises two steps, the main purpose of the polishing in the first step will be to remove a relatively large waving as well as surface defects such as nodules and large pits on the substrate surface, i.e. fairing. Accordingly, a polishing composition is required which has a high ability of correcting the above-mentioned waving and surface defects without forming deep scratches which can not be removed by polishing in the second step, rather than minimizing the surface roughness.

The purpose of polishing in the second step i.e. finishing polishing, is to minimize the surface roughness of the substrate. Accordingly, it is important that the polishing composition is capable of minimizing the surface roughness and capable of preventing formation of micro protrusions, fine pits or other surface defects rather than it has a high ability for correcting a large waving or surface defects as required for polishing in the first step. Further, from the viewpoint of the productivity, it is also important that the stock removal rate is high. So far as the present inventors are aware, in the conventional two step polishing, it was possible to obtain a substrate surface having a good surface roughness in the polishing in the second step, but the stock removal rate was very low and inadequate for practical production. The degree of the surface roughness is determined depending upon the process for producing the substrate, the final recording capacity as a memory hard disk and other conditions. However, depending upon the desired degree of surface roughness, a polishing process comprising more than two steps, may be employed.

For the above purpose, particularly in finishing polishing in two steps, it has been common to carry out polishing by means of a polishing composition prepared in such a manner that aluminum oxide or other abrasive is thoroughly pulverized and adjusted for proper particle size, water is added thereto, and aluminum nitrate or various organic acids and other polishing accelerators are incorporated thereto, or a polishing composition comprising colloidal silica and water. However, the polishing by means of the former polishing composition had a problem that the balance between the mechanical component and the chemical component was poor, and micro protrusions or fine pits tended to form. The polishing by means of the latter polishing composition had a problem such that the stock removal rate was so low that it took a long time for polishing, and the productivity was low, roll off (or "dove off") as an index of sagging of an end face of the substrate tended to deteriorate, or washing after the polishing tended to be difficult.

SUMMARY OF THE INVENTION

It is an object of the present invention to solve the above problems and to provide a polishing composition which has a high stock removal rate and is capable of providing a polished surface having a good surface roughness, which has been desired for a polishing composition in finishing polishing of a substrate to be used for a memory hard disk, and which is further capable of preventing formation of micro protrusions, fine pits and other surface defects.

The present invention provides a polishing composition for polishing a memory hard disk comprising water and at least one abrasive selected from the group consisting of silicon dioxide, aluminum oxide, cerium oxide, zirconium oxide, titanium oxide, silicon nitride and manganese dioxide, which further contains an iron compound dissolved in the composition, said iron compound being selected from the group consisting of iron(III) nitrate, iron(III) sulfate, ammonium iron(III) sulfate, iron(III) perchlorate and an iron salt of an organic acid.

Further, the present invention provides a method for preparing a memory hard disk, which comprises polishing a substrate for the memory hard disk by means of the above polishing composition.

The polishing composition for polishing a memory hard disk of the present invention has a high stock removal rate and is capable of providing a polished surface having a good surface roughness, and it is further capable of preventing formation of micro protrusions, fine pits and other surface defects.

Further, according to the method for producing a memory hard disk of the present invention, the productivity is high as the stock removal rate is high, and it is possible to obtain a memory hard disk having a good surface roughness and having no substantial micro protrusions, fine pits and other surface defects.

DETAILED DESCRIPTION OF THE PREFERRED EMBODIMENTS

Abrasive

The abrasive which is suitable for use as the main abrasive among the components of the polishing composition of the present invention, is selected from the group consisting of silicon dioxide, aluminum oxide, cerium oxide, titanium oxide, silicon nitride, zirconium oxide and manganese dioxide. The abrasive is not limited to any particular one of these, but is preferably silicon dioxide. Further, these abrasives may be used in combination as a mixture of a plurality of them.

Silicon dioxide includes colloidal silica, fumed silica and many other types which are different in the methods for their production or in their properties.

Also, aluminum oxide includes $\alpha$-alumina, $\delta$-alumina, $\theta$-alumina, $\kappa$-alumina and other morphologically different substances. Further, it includes one called fumed alumina from the method for its production.

Cerium oxide includes trivalent and tetravalent ones from the oxidation numbers, and it includes hexagonal system, isometric system and face-centered cubic system ones from the crystal systems.

Zirconium oxide includes monoclinic system, tetragonal system and amorphous ones from the crystal systems. Further, it includes one called fumed zirconia from the method for its production.

Titanium oxide includes titanium monoxide, dititanium trioxide, titanium dioxide and others from the crystal systems. Further, it includes one called fumed titania from the method for its production.

Silicon nitride includes $\alpha$-silicon nitride, $\beta$-silicon nitride, amorphous silicon nitride and other morphologically different silicon nitrides.

Manganese dioxide includes $\alpha$-manganese dioxide, $\beta$-manganese dioxide, $\gamma$-manganese dioxide, $\delta$-manganese dioxide, $\epsilon$-manganese dioxide, $\eta$-manganese dioxide and others from its morphology.

For the composition of the present invention, these abrasives may be employed in optional combination as the case requires. When they are used in combination, the manner of the combination, and the proportions of the respective abrasives are not particularly limited.

Among these abrasives, fumed silica, fumed alumina, fumed titania and fumed zirconia have small particle sizes and thus are preferably used as the abrasive for the present invention.

The above abrasive is to polish a surface to be polished by a mechanical action as abrasive grains. Among them, the particle size of silicon dioxide is usually from 0.005 to 0.5 $\mu$m, preferably from 0.01 to 0.2 $\mu$m, as the average particle size obtained by the surface area measured by a BET method. Likewise, the particle sizes of aluminum oxide, zirconium oxide, titanium oxide, silicon oxide and manganese dioxide are usually from 0.01 to 10 $\mu$m, preferably from 0.05 to 3 $\mu$m, as the average particle sizes measured by a BET method. Further, the particle size of cerium oxide is usually from 0.01 to 10 $\mu$m, preferably from 0.05 to 3 $\mu$m, as the average particle size observed by a scanning electron microscope.

If the average particle sizes of these abrasives exceed the above-mentioned ranges, the surface roughness of the polished surface tends to be bad, or scratching is likely to result. On the other hand, if they are less than the above-mentioned ranges, the stock removal rate tends to be very low and impractical.

The content of the abrasive in the polishing composition is usually from 0.1 to 50 wt %, preferably from 1 to 25 wt %, based on the total amount of the composition. If the content of the abrasive is too small, the stock removal rate tends to be low. On the other hand, if it is too much, uniform dispersion tends to be hardly maintained, and the viscosity of the composition tends to be so high that the handling tends to be difficult.

Whereas, the iron compound is to promote the polishing action by a chemical action as a polishing accelerator, the valency of iron of the iron compound to be used may be any, but is preferably trivalent. Further, the iron compound to be used is required to be dissolved in the composition, and it is preferably an iron salt. Further, this iron salt may be an inorganic iron salt or an organic iron salt. The iron compound to be used is not particularly limited so long as it does not impair the effects of the present invention, and it may, for example, be iron nitrate, iron sulfate, ammonium iron sulfate, iron perchlorate, iron citrate, ammonium iron citrate or ammonium iron oxalate, (the valency of iron of each of them may be bivalent, trivalent or higher) or others such as potassium ferricyanide, potassium ferrocyanide and other iron complex salts. Among them, particularly preferred is a one selected from the group consisting of iron(III) nitrate, iron(III) sulfate, ammonium iron(III) sulfate, iron(III) perchlorate, iron(III) citrate, ammonium iron(III) citrate and ammonium iron(III) oxalate. These iron compounds may be employed in combination in optional proportions. Among these iron compounds, iron(III) nitrate is particularly preferred in view of the anti-settling property in the resulting polishing composition or the storage stability of the composition.

Further, in the composition of the present invention, as the iron compound to be blended, an iron(II) compound may be used so that it may be converted to trivalent in the polishing composition. In such a case, it is preferred that substantially the entire amount of the iron(II) compound be oxidized in the composition to trivalent. This oxidation reaction may be carried out by an addition of an oxidizing agent, or may be carried out by oxygen in air.

The content of the iron compound in the polishing composition of the present invention varies depending upon the effects of the particular compounds, but it is usually preferably from 0.01 to 40 wt %, more preferably from 0.05 to 20 wt %, based on the total amount of the polishing composition. The effects of the present invention tend to increase as the amount of the iron compound increases. However, if the amount is too much, the degree of improvement tends to be small, whereby an economical demerit is likely to result, and, not only that, such may sometimes cause formation of surface defects such as pits.

Polishing Composition

The polishing composition of the present invention is prepared usually by mixing and dispersing an abrasive selected from the group consisting of silicon dioxide, aluminum oxide, cerium oxide, zirconium oxide, titanium oxide, silicon nitride and manganese dioxide in water at an optional concentration, and further dissolving the iron compound therein. The method for dispersing or dissolving these components in water is optional. For example, they may be dispersed by stirring by a vane-type stirring machine or by ultrasonic dispersion. Further, the order of mixing them is optional, and either dispersion of the abrasive or dissolution of the iron compound may be carried out first, or such dispersion and dissolution may simultaneously be carried out.

Further, at the time of preparing the above polishing composition, various known additives may further be added for the purposes of stabilizing or maintaining the quality of the product, or depending upon the type of the object to be treated, the polishing conditions or the necessity for other processing conditions. Preferred examples of such additives include (a) cellulose, carboxymethylcellulose and hydroxyethylcellulose, and other celluloses, (b) ethanol, propanol and ethylene glycol, and other water-soluble alcohols, (c) a sodium alkylbenzenesulfonate and a formalin condensate of naphthalenesulfonic acid, and other surfactants, (d) a lignin sulfonate and a polyacrylate, and other organic polyanionic substances, (e) a polyvinyl alcohol, and other water-soluble polymers (emulsifiers), (f) sodium arginate, potassium hydrogencarbonate, and other bactericides, and (g) soluble metal salts other than the iron compound. Further, it is also possible to employ the above-mentioned abrasive or the polishing accelerator, which is suitable for use in the polishing composition of the present invention, as an auxiliary additive for the purpose other than as the abrasive, for example, for the purpose of preventing settling of the abrasive.

The polishing composition of the present invention usually has a pH of at most 7 by the addition of the main components. The pH of the polishing composition may vary depending upon the addition of various auxiliary additives. However, to effectively obtain the effects of the present invention, the pH is preferably at most 7. Accordingly, if the pH of the polishing composition exceeds 7, it is preferred to adjust the pH by an addition of e.g. an acid.

Further, the polishing composition of the present invention may be prepared and stored or transported in the form of a stock solution having a relatively high concentration, and may be used by diluting it at the time of the actual polishing treatment. The above-mentioned preferred ranges of concentration are concentrations at the time of actual polishing treatment. Needless to say, when such a method of use is employed, the polishing composition will be a solution having a higher concentration in the state in which it is stored or transported. Further, from the viewpoint of the handling efficiency, it is preferred that the polishing composition is prepared in such a concentrated form.

The detailed mechanism is not clearly understood with respect to the reason why the polishing composition of the present invention has a high stock removal rate and is capable of providing a polished surface having a good surface roughness without formation of micro protrusions, fine pits and other surface defects in the polishing of a substrate. However, it may be explained as follows taking a Ni—P plated substrate as an example.

With respect to the reason for the high speed in polishing the Ni—P plating, it is considered that iron ions serve to chemically modify the Ni—P plating surface to make it brittle, and the brittle Ni—P plating surface can readily be removed by the mechanical action of the abrasive. Further, it is considered that the iron ions present in the slurry will contribute to the dispersed state of a certain specific abrasive of the present invention, so that the mechanical polishing speed will be increased by agglomerates having a proper size. It is considered that on other hand, by the iron ions, the agglomeration/dispersion state among the abrasive particles is properly maintained, and formation of excessively large agglomerates is prevented, and at the same time iron ions exhibit a proper level of etching action against the Ni—P plating, whereby the surface roughness tends to be good, and micro protrusions, fine pits and other surface defects will be minimized.

Preparation of a Memory Hard Disk

The method for preparing a memory hard disk according to the present invention, comprises polishing a memory hard disk by means of the above-described polishing composition.

The substrate of the memory hard disk to be polished may, for example, be a Ni—P disk, a Ni—Fe disk, an aluminum disk, a boron carbide disk, a carbon disk or the like. Among them, it is preferred to employ a Ni—P disk or an aluminum disk.

The method for preparing a memory hard disk of the present invention may employ any conventional polishing method for a memory hard disk or any combination of polishing conditions, so long as the above-described polishing composition is used.

For example, as the polishing machine, a one side polishing machine, a both side polishing machine or other machines may be employed. Further, the polishing pad may be of a suede type, a non-woven fabric type, a flocked fabric type, a raising type or the like.

Further, the polishing composition used in the method for preparing a memory hard disk of the present invention has a high stock removal rate and at the same time provides a flat polished surface. Accordingly, the polishing process can be carried out in one step, or can be carried out in two or more steps under different polishing conditions. In a case where the polishing process is carried out into two or more steps, it is preferred that the polishing step employing the above-described polishing composition will be the final polishing step, i.e. the preliminarily polished substrate will be polished by means of the above-described polishing composition. More preferably, the polishing process comprises two steps i.e. a first polishing step employing a polishing composition other than the above-described polishing composition, and a second polishing step employing the above-described polishing composition.

Now, the polishing composition of the present invention will be described in further detail with reference to Examples. However, it should be understood that the present invention is by no means restricted to such specific Examples.

Preparation of a Polishing Composition

Firstly, as the abrasive, colloidal silica (primary particle size: 0.035 $\mu$m), fumed silica, fumed alumina (primary particle size of each: 0.05 $\mu$m), fumed zirconia (primary particle size: 0.03 $\mu$m), fumed titania (primary particle size: 0.02 $\mu$m), aluminum oxide, cerium oxide, silicon nitride and manganese dioxide (primary particle size of each: 0.2 $\mu$m) were prepared. These abrasives were respectively dispersed in water by means of a stirrer to obtain slurries having an abrasive concentration of 10 wt %. Then, the iron compounds (in Comparative Examples, the polishing accelerators other than iron) as identified in Table 1 were added and mixed to the slurries, respectively, in an amount of 3 wt %, to obtain test samples of Examples 1 to 16 and Comparative Examples 1 to 6.

Preparation of Substrates for Polishing Tests

Substrates were prepared for carrying out polishing tests employing the above polishing compositions In order to carry out the evaluation by polishing in two steps, firstly, substrates for the tests were prepared as follows.

Polishing Conditions (First Step)
Object to be polished: 3.5" electroless Ni—P substrate
Polishing machine: one side polishing machine
Polishing pad: Surfin08-3 slice (manufactured by FUJIMI INCORPORATED)
Treating pressure: 80 g/cm$^2$
Platen rotational speed: 50 rpm
Polishing composition: DISKLITE-1312 (manufactured by FUJIMI INCORPORATED)
Dilution of the composition: 1:2 pure water
Supply rate of the polishing composition: 15 cc/min
Polishing time: 5 minutes
Polishing Test Then, using the above polishing composition and the substrate treated by the polishing in the first step, a polishing test was carried out. The conditions were as follows.

Polishing Conditions (Second Step)
Object to be polished: 3.5" electroless Ni—P substrate (already polished in the first step)
Polishing machine: one side polishing machine
Polishing pad: Polilex DG (manufactured by Rodel Co., U.S.A.)
Treating pressure: 80 g/cm$^2$
Platen rotational speed: 50 rpm
Dilution of the composition: Non dilution
Supply rate of the polishing composition: 15 cc/min
Polishing time: 10 minutes After the polishing, the substrate was sequentially washed and dried, and then, the weight reduction of the substrate by the polishing was measured. The polishing test was carried out three times for each sample, and the stock removal rate was obtained from the average.

Further, using a non-contact type surface roughness meter (object lens: 80 magnifications), with respect to one sample, the surface roughness at the center portion in a radial direction of the substrate was measured once, and then, the substrate was rotated for 90°, whereupon the measurement was made in the same manner. With respect to the three samples obtained by the three polishing tests, the measurement was carried out in the same manner, and the surface roughness was obtained from the average.

Further, using a differential interference microscope (400 magnifications), the presence or absence of formation of micro protrusion or fine pits on the substrate surface, was examined. The evaluation standards were as follows.

⊚: No micro protrusion or fine pits are visually observed.

○: No substantial micro protrusion or fine pits are visually observed.

Δ: Some micro protrusion or fine pits are visually observed, but they are not of a problematic level.

×: Substantial micro protrusion or fine pits are visually observed, and they are of a problematic level.

The results obtained, were as shown in Table 1.

TABLE 1

|   | Abrasive | Iron compound | Stock removal rate ($\mu$m/min) | Surface roughness (nm) | Micro protrusion | Fine pits |
| --- | --- | --- | --- | --- | --- | --- |
| 1 | Colloidal silica | Iron(III) nitrate | 0.13 | 0.298 | ⊚ | ○ |
| 2 | Colloidal silica | Iron(III) sulfate | 0.13 | 0.245 | ⊚ | ○ |
| 3 | Colloidal silica | Ammonium iron(III) sulfate | 0.12 | 0.293 | ⊚ | ○ |

TABLE 1-continued

| | Abrasive | Iron compound | Stock removal rate (μm/min) | Surface roughness (nm) | Micro protrusion | Fine pits |
|---|---|---|---|---|---|---|
| 4 | Colloidal silica | Iron(III) perchlorate | 0.12 | 0.290 | ⊚ | ○ |
| 5 | Colloidal silica | Iron(III) citrate | 0.10 | 0.236 | ⊚ | ○ |
| 6 | Colloidal silica | Ammonium iron(III) citrate | 0.09 | 0.227 | ⊚ | ○ |
| 7 | Colloidal silica | Ammoniuin iron(III) oxalate | 0.09 | 0.231 | ⊚ | ○ |
| 8 | Fumed silica | Iron(III) nitrate | 0.17 | 0.412 | ⊚ | ○ |
| 9 | Aluminum oxide | Iron(III) nitrate | 0.25 | 0.601 | ⊚ | ○ |
| 10 | Fumed alumina | Iron(III) nitrate | 0.17 | 0.372 | ⊚ | ○ |
| 11 | Cerium oxide | Iron(III) nitrate | 0.19 | 0.558 | ⊚ | ○ |
| 12 | Fumed zirconia | Iron(III) nitrate | 0.16 | 0.466 | ⊚ | ○ |
| 13 | Fumed titania | Iron(III) nitrate | 0.16 | 0.448 | ⊚ | ○ |
| 14 | Silicon nitride | Iron(III) nitrate | 0.20 | 0.551 | ⊚ | ○ |
| 15 | Manganese dioxide | Iron(III) nitrate | 0.11 | 0.421 | ⊚ | ○ |
| Comparative 1 | Colloidal silica | Nil | 0.03 | 0.336 | ⊚ | ○ |
| Comparative 2 | Fumed silica | Nil | 0.05 | 0.491 | ⊚ | ○ |
| Comparative 3 | Aluminum oxide | Aluminum nitrate | 0.21 | 0.942 | ○ | ○ |
| Comparative 4 | Aluminum oxide | Gluconic acid | 0.21 | 0.978 | × | Δ |
| Comparative 5 | Fumed alumina | Aluminum nitrate | 0.05 | 0.401 | ○ | ○ |
| Comparative 6 | Fumed alumina | Gluconic acid | 0.05 | 0.487 | × | Δ |

From the results shown in Table 1, it is evident that the polishing compositions of the present invention have remarkably high stock removal rates against memory hard disks relative to polishing compositions containing no iron compound, and they exhibit excellent results for the surface roughness and for the prevention of formation of micro protrusion and fine pits, relative to polishing compositions containing polishing accelerators other than an iron compound.

As described in the foregoing, the polishing composition of the present invention has a high stock removal rate and is capable of providing a polished surface having a good surface roughness and further capable of preventing formation of micro protrusion, fine pits and other surface defects. Further, according to the method for preparing a memory hard disk of the present invention, the stock removal rate is high, whereby the productivity is high, and it is possible to obtain a memory hard disk having a good surface roughness and little micro protrusion, fine pits and other surface defects, as mentioned above.

What is claimed is:

1. A method for preparing a memory hard disk, the method comprising polishing a substrate for a memory hard disk by means of a polishing composition, wherein
   the polishing composition comprises water and at least one abrasive selected from the group consisting of silicon dioxide, aluminum oxide, cerium oxide, zirconium oxide, titanium oxide, silicon nitride and manganese dioxide, and
   the polishing composition further comprises an iron compound selected from the group consisting of iron(III) citrate, ammonium iron(III) citrate and ammonium iron(III) oxalate.

2. The method according to claim 1, wherein a content of the iron compound is from 0.01 to 40 wt %, based on a weight of the polishing composition.

3. The method according to claim 1, wherein the substrate is a Ni—P disk or an aluminum disk.

4. The method according to claim 1, wherein the substrate is preliminarily polished.

5. The method according to claim 1, wherein the polishing composition has a pH of at most 7.

6. The method according to claim 1, wherein a content of the at least one abrasive in the polishing composition is from 0.1 to 50 wt %, based on a weight of the polishing composition.

7. The method according to claim 1, further comprising preparing the polishing composition by mixing the at least one abrasive to form a mixed abrasive, dispersing the mixed abrasive in water and dissolving the iron compound in water.

8. The method according to claim 1, further comprising diluting a stock solution with water to prepare the polishing composition.

* * * * *